3,733,384
PROCESS FOR PREVENTING FLUID LEAKAGE IN
EXTRUSION BLOW MOLDING
Albert F. Gerlovich, Fanwood, and George H. Dunbeker,
Old Bridge, N.J., assignors to Rheem Manufacturing
Company, New York, N.Y.
Continuation of abandoned application Ser. No. 866,665,
Oct. 15, 1969. This application Jan. 19, 1972, Ser.
No. 219,170
Int. Cl. B29c 17/07
U.S. Cl. 264—98
1 Claim

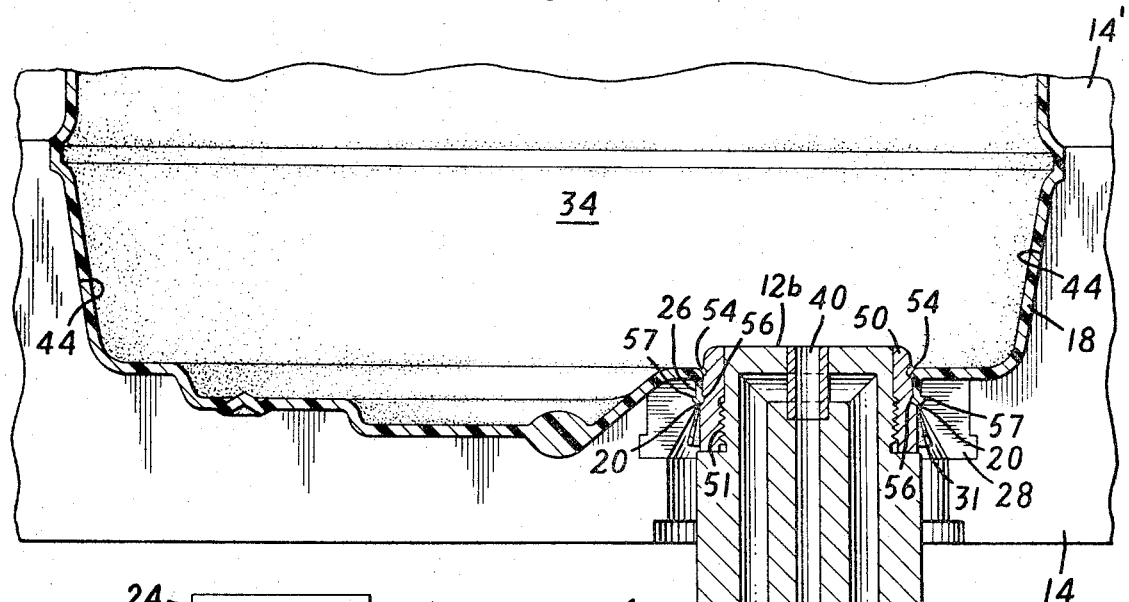
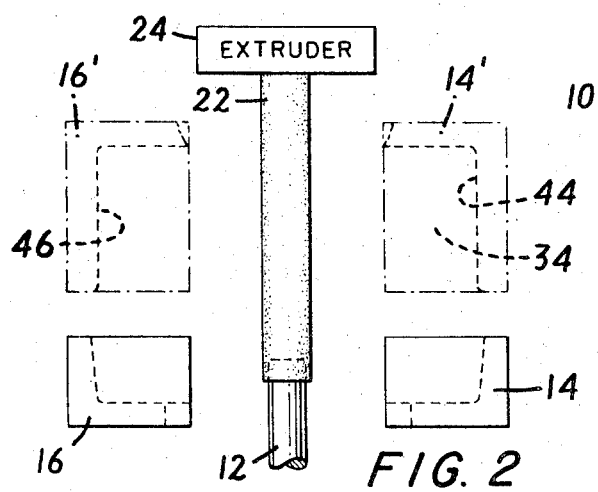
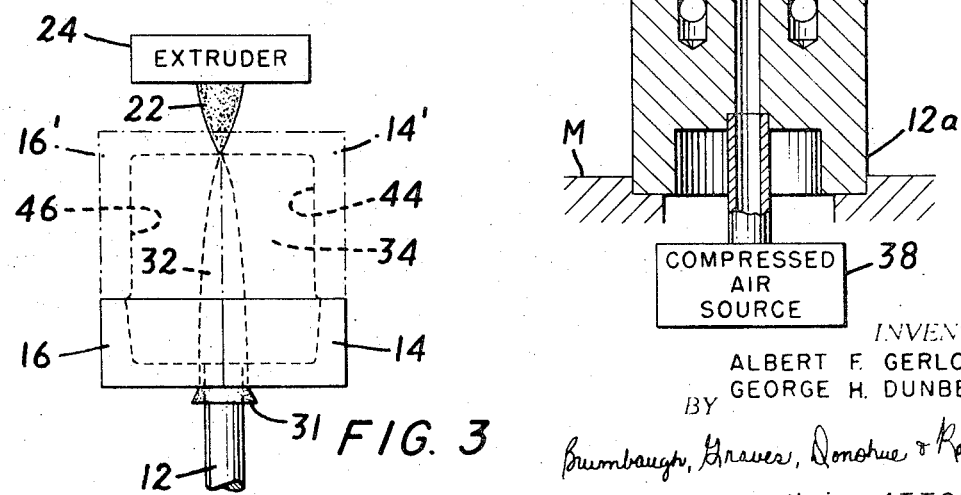

ABSTRACT OF THE DISCLOSURE

A blow pin on the one hand and outer partible mold sections on the other are complementally shaped substantially to engage each other along a circular cutting edge when the mold sections are closed about the blow pin. The portion of the blow pin that engages the outer partible mold sections is provided with a removable sleeve formed with a pair of annular grooves extending circumferentially of the blow pin. The sleeve cooperates with removable inserts in the outer mold sections. A container is fabricated the neck of which is fully formed by the initial cooperation between the blow pin and mold sections and the remainder of which is formed by a subsequent blowing operation.

---

This is a continuation of application Ser. No. 866,665, filed Oct. 15, 1969, now abandoned.

BACKGROUND OF THE INVENTION

This invention relates to molding and, more particularly, to novel and highly effective extrusion-blow molding methods facilitating the economical fabrication of a wide variety of articles, including, for example, five-gallon containers for industrial use.

In conventional extrusion-blow molding apparatus, leakage of air around the blow pin during the blow cycle is likely to occur. This has several consequences, some quite serious.

One of the less serious consequences is that the time required for blowing with a given air supply is increased or, to blow in the same time, an air supply of greater capacity is required; and that a continuous supply of air is required following expansion of the article until it has cooled sufficiently to maintain its shape.

One very serious consequence is that escape of air between the blow pin and the plastic forming the neck tends to erode the plastic and produce irregularities in the radially inner surface of the neck. Surprisingly, it can also produce irregularities in the radially outer surface of the neck, possibly by gross deformation of the neck or by being directed around the end of the neck by the edge of the outer mold sections. Such irregularities are likely to lead in turn to failure of the container to pass certain tests, such as drop and hydrostatic tests. These are tests for leakage of the container around the neck when filled with liquid and capped, and then dropped from a standard height onto a standard surface and subjected to a predetermined elevated internal pressure.

The problem of neck malformation is aggravated because the blow pin and outer mold sections are subject to wear at the critical point where they cooperate with each other. Such wear in time produces a very substantial gap between the blow pin and the mold sections so that the extruded tube is not substantially severed upon closing of the mold sections about the blow pin and so that, during the blow cycle, leakage of air or plastic or both around the blow pin reaches proportions that are quite unacceptable. The completed article has ragged flashing remnants and is otherwise misshapen and poorly adapted for cooperation with a cap, a flexible spout, or another fitting intended to be applied to the container neck.

Except in extreme cases, imperfections of the neck can be removed more or less successfully by machining, but this additional step adds significantly to the cost of the article.

When worn, conventional apparatus moreover can be restored to an "as new" condition (which, as noted above, leaves much to be desired) only by replacement of the mold core, the outer mold sections with which the mold core cooperates, or both. The repair is expensive not only from the standpoint of parts and labor but also, and principally, from the standpoint of lost production.

SUMMARY OF THE INVENTION

An object of the invention is to remedy the problems of conventional methods outlined above and to provide extrusion-blow molding methods adapted to produce articles including, for example, five-gallon containers for industrial use, of high quality and at low cost. In particular, an object of the invention is to produce inexpensively a plastic container having a neck portion adapted to cooperate with standard fittings so that the container can be provided with a cap or a flexible spout, for example, at the option of the user. Another object of the invention is to reduce the cost of maintenance of extrusion-blow molding apparatus.

The foregoing and other objects of the invention are attained by the provision of a blow pin cooperating with outer partible mold sections to define a mold within which a container is fabricated. The blow pin on the one hand and the outer partible mold sections on the other are complementally shaped to engage each other along a circular cutting edge when the mold sections are closed about the blow pin.

With the mold sections open, a tube of plastic is extruded and disposed around the blow pin in substantially coaxial relation therewith. The mold sections are then closed, thus fully forming the container neck, substantially severing the plastic tube along the knife edge to form a smooth top to the container neck and produce waste plastic that can be reprocessed, and trapping a portion of the tube within the blow mold cavity. Air is blown through the blow pin to expand the trapped portion of the plastic tube against the surfaces of the partible mold sections defining the outer limits of the blow mold cavity.

The portion of the blow pin that engages the outer partible mold sections is provided with a removable sleeve, and the portions of the outer mold sections that engage the blow pin are provided with removable inserts. The sleeve and the inserts cooperate to define the cutting edge, and both the sleeve and the inserts can be replaced when worn. The removable sleeve is formed with a pair of annular grooves extending circumferentially of the blow pin. The annular grooves tend to fill with plastic during the initial molding of the container neck and facilitate the maintenance of a seal between the plastic and the blow pin during the blowing cycle.

BRIEF DESCRIPTION OF THE DRAWING

An understanding of additional aspects of the invention may be gained from a consideration of the following detailed description of a preferred embodiment thereof, in conjunction with the appended figures of the drawing, wherein:

FIG. 1 is a detailed fragmentary front elevational view, partly in section, of representative apparatus constructed in accordance with the invention;

FIG. 2 is a schematic side elevational view on a smaller scale than FIG. 1 of apparatus in accordance with the invention in an open position; and FIG. 3 is a schematic side elevational view on the same scale as FIG. 2 of apparatus in accordance with the invention in a closed position.

DESCRIPTION OF THE PREFERRED EMBODIMENT

FIG. 1 shows apparatus 10 constructed in accordance with the invention. The apparatus 10 includes a blow pin 12 having a base portion 12a for connection to a suitable mount M and a mold portion 12b for cooperation with outer partible mold sections 14 and 16 to define a mold within which a container 18 is fabricated. The blow pin 12 on the one hand and the outer partible mold sections 14 and 16 on the other are complementally shaped substantially to engage each other along a circular cutting edge 20 when the mold sections 14 and 16 are closed about the blow pin 12.

It is preferred that the conformation of the blow pin 12 on the one hand and of the mold sections 14 and 16 on the other both be angularly convex so that the cutting effect at the cutting edge 20 is maximized. It is within the scope of the invention, however, to form the blow pin 12, for example, cylindrically at the point of contact and to effect the cutting by the conformation of the mold sections 14 and 16. It is also within the scope of the invention to remove the cutting edge from the mold sections 14 and 16 and to produce the cutting effect by the conformation of the blow pin 12.

The cutting edge 20 is circular, but other shapes, including oval, square, and rectangular, as well as irregular shapes, can be employed if desired. The circular shape is very easy to manufacture and assures that the cutting effect produced at any one point along the circumference of the blow pin is substantially the same as the cutting effect produced at all other points along such circumference. Moreover, a circular shape results in a circular container opening, which is adapted to receive the most popular types of fittings (caps, flexible spouts, etc.).

With the mold sections 14 and 16, and such additional outer mold sections 14' and 16' as may be desired (FIG. 2), open, a tube of plastic 22 is extruded from an extruder 24 and disposed around the blow pin 12 in substantially coaxial relation therewith. The axis of the tube as extruded may be offset somewhat from the the axis of the blow pin 12 provided that, by means of expanders or any other suitable conventional apparatus, the tube 22 can be brought to a position nearly enough coaxial with the blow pin 12 so that the tube 22 fits around the blow pin 12, as shown in FIG. 2.

When the tube 22 is in position, the mold sections 14 and 16, together with the remaining mold sections 14' and 16', if any (FIG. 3), are closed. The closing of the mold sections 14 and 16 about the blow pin 12 grips the mold substance between the blow pin 12 and mold sections 14 and 16 and fully forms the container neck 26 both on the inside and on the outside of the neck 26. The inside of the neck is of course molded by the blow pin 12 and, more particularly, by a sleeve 50 thereon; and the outside of the neck is molded by the mold sections 14 and 16 and, more particularly, by a removable insert 28 in the mold section 14 and a corresponding insert in the mold section 16. The inserts 28 are preferably held in place by conventional flat-head set screws (not shown).

The closing of the mold sections 14 and 16 about the blow pin 12 substantially severs the plastic tube 22 along the cutting edge 20 to form a smooth top to the container neck 26 and produce a small ring 31 of waste plastic that can be easily broken off upon removal of the completed article and reprocessed. The closing of the mold sections 14 and 16 also traps a portion 32 of the plastic tube 22 within the blow mold cavity 34.

The blow pin 12 is formed with conduit means such as a channel 36 communicating with a source 38 of fluid under pressure (compressed air, for example). The compressed air or another fluid is blown through the blow pin 12 through one or more openings 40 communicating with the cavity 34 to expand the trapped portion 32 of the tube 22 against the surfaces 44 and 46 of the mold sections (including the sections 14 and 16, respectively, and any remaining sections such as 14' and 16' that are employed) defining the outer limits of the blow mold cavity 34. An additional conduit 36' circulates a fluid such as water for temperature regulation.

The portion of the blow pin 12 that engages the outer partible mold sections 14 and 16 and, more particularly, that engages the inserts 28 thereof, is provided with a removable sleeve 50 that can be replaced when worn. The sleeve 50 is secured removably by any suitable means such as threads 51 to the blow pin 12 and is formed with a pair of annular grooves 54 and 56 extending circumferentially of the blow pin 12 and axially spaced apart along the blow pin 12 from each other. The annular grooves tend to fill with plastic or another mold substance during the initial molding of the container neck 26 and form a labyrinth that facilitates the maintenance of a seal between the plastic and the blow pin 12 during the blowing cycle. The annular groove means may comprise only one annular groove or three or more annular grooves, the preferred number being two.

The inserts 28 are also formed with groove means such as an annular groove 57. This further facilitates trapping of the mold substance.

High pressures are employed during the blowing cycle, and, heretofore, there has been a tendency for the air to force its way between the plastic and the blow pin. The air therefore has not been fully effective in expanding the trapped portion of the plastic tube, and this has added to the time and difficulty involved in the blowing cycle. In addition, and more importantly, the escape of air tends to erode the plastic and otherwise produce irregularities therein. These problems are overcome in accordance with the present invention.

When the outer mold sections are opened after completion of the blowing, waste plastic at the top and bottom of the container is easily and cleanly separated, by hand if desired, from the container proper and reprocessed.

Thus, there are provided in accordance with the invention novel and highly-effective methods and apparatus facilitating the production of molded plastic articles, including notably containers for industrial use. Provision is made for repairing the apparatus at minimum cost. Replacement of the sleeve 50 and the inserts 28 is very inexpensive in terms of parts, labor and machine-down time. The containers made in accordance with the invention are adapted for use, without machining, in combination with standard fittings such as caps and flexible spouts and can be made economically.

Many modifications of the representative embodiments of the invention disclosed herein will readily occur to those skilled in the art. For example, polypropylene, polyethylene (low, medium or high density) and other organic plastic materials may be employed as the mold substance. The invention is to be construed as including all of the embodiments thereof within the scope of the appended claims.

We claim:

1. A blow molding process comprising the steps of extruding a tube of organic plastic material, positioning said extruded tube and a blow pin relatively so that said extruded tube surrounds at least a portion of said blow pin, closing outer partible mold sections about said blow pin so as to engage said extruded tube between said outer partible mold sections on the one hand and said blow pin on the other in sealing relation and trap a portion of said tube within said outer partible mold sections, providing a pair of annular grooves in said blow pin where it engages said extruded tube so that, upon engagement of said extruded tube by said outer partible mold sections and said blow pin, said extruded tube is given a complemental molding by said annular grooves, substantially severing said extruded tube simultaneously with said closing, and blowing a fluid through said blow pin into said trapped portion of said extruded tube to expand said trapped portion of said extruded tube against the surfaces of said partible mold sections defining the outer limits of said mold cavity, one of said annular grooves being at the extremity of said trapped portion of said extruded tube, and said annular grooves and said complemental molding cooperating to prevent said fluid from leaking between said trapped portion of said extruded tube and said blow pin during said blowing.

References Cited

UNITED STATES PATENTS

| | | | |
|---|---|---|---|
| 3,031,718 | 5/1962 | Adams | 264—98 X |
| 3,032,809 | 5/1962 | Willard | 264—98 X |
| 3,363,282 | 1/1968 | Hagen | 264—98 X |
| 3,422,174 | 1/1969 | Hagen | 264—98 X |
| 3,534,435 | 10/1970 | John | 264—98 X |

ROBERT F. WHITE, Primary Examiner

J. H. SILBAUGH, Assistant Examiner

U.S. Cl. X.R.

425—326 B